United States Patent Office 3,388,397
Patented June 11, 1968

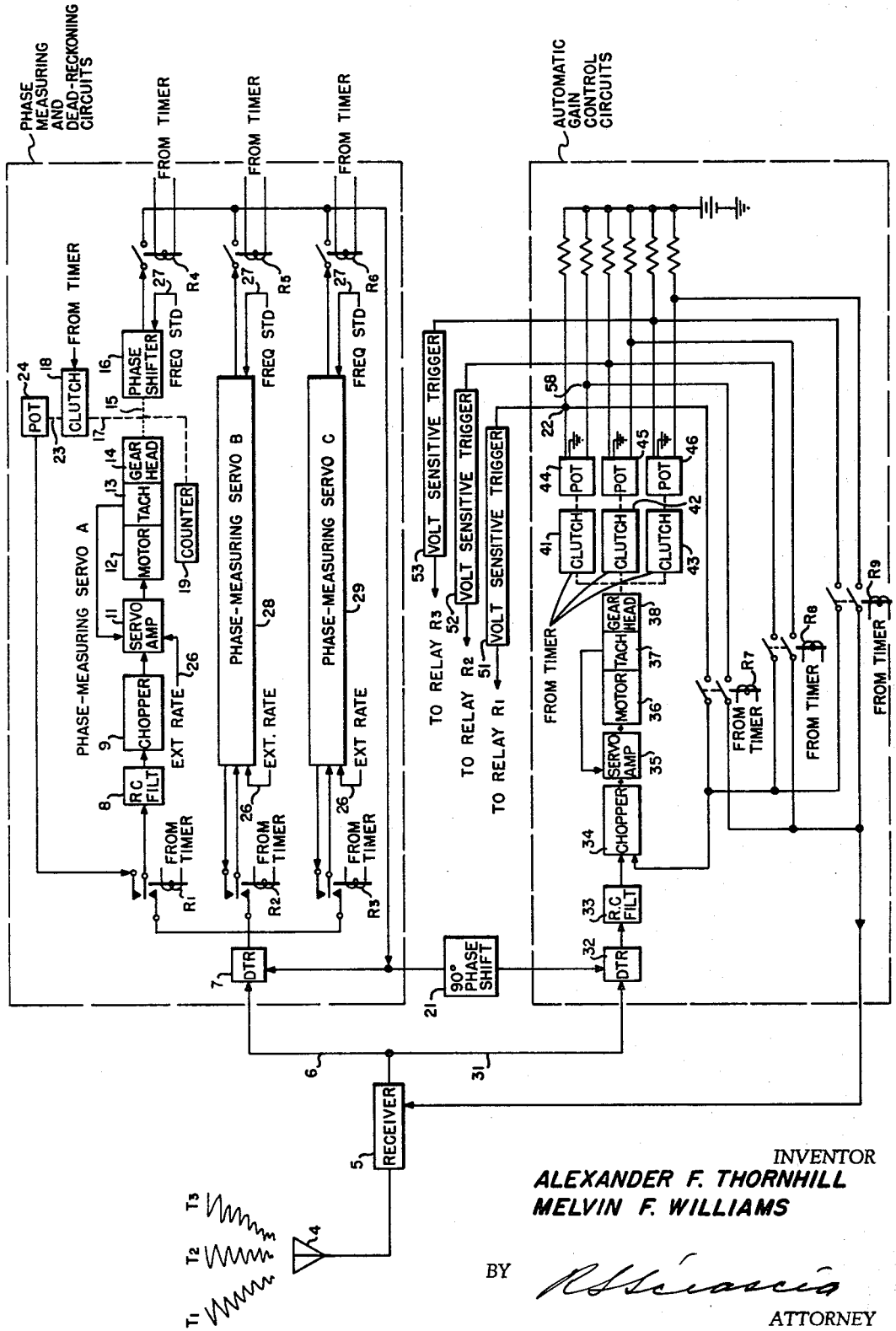

3,388,397
RADIO NAVIGATION RECEIVING SYSTEM UTILIZING AGC FOR SWITCHING FROM PHASE-MEASURING MODE OF OPERATION TO A DEAD RECKONING MODE
Alexander F. Thornhill, Accokeek, Md., and Melvin F. Williams, Washington, D.C., assignors to the United States of America as represented by the Secretary of the Navy
Filed Sept. 28, 1966, Ser. No. 583,120
15 Claims. (Cl. 343—105)

ABSTRACT OF THE DISCLOSURE

An airborne navigation receiver apparatus which utilizes phase-measuring servos and automatic gain control circuits so that when the incoming navigation signals are weak or are not transmitting for short time periods the AGC circuits enable the phase-measuring servos to go into a dead-reckoning mode of operation until the navigation signals are stronger and the phase-measuring servos are activated by these signals.

---

The invention described herein may be manufactured and used by or for the Government of the United States of America for governmental purposes without the payment of any royalties thereon or therefor.

The present invention relates to aircraft navigation receivers and more particularly to a radio navigation receiver to be used in aircraft wherein external rate-aiding inputs, stored wind voltages and automatic gain control (signal level) circuits are used in conjunction with phase-measuring and dead-reckoning circuits in order to increase the navigation accuracy and the permissible velocity and maneuverability of the aircraft during periods of signal reception. Also, during periods of signal loss the invention will enable the receiver to continue to generate navigation information (through straight flight and/or maneuvering) from external rate-aiding and stored integrator error voltages (primarily stored wind voltages). Also, during signal loss the invention will continuously adjust the phase of a phase detector reference input so that this reference phase will coincide as nearly as possible with the phase of the incoming signal when it returns, thus reducing the time required for phase lock. In addition, during periods of signal loss the invention, when used in conjunction with the Omega Navigation system, will prevent lane loss during these periods.

In the field of long-range radio navigation systems, it has been the general practice to employ receiving apparatus for determining position either by use of hyperbolic or circular (sometimes called "range-range" or "rho-rho") coordinates. Although such devices have served the purpose, they have not proved entirely satisfactory under all conditions of service for the reasons that considerable difficulty has been experienced in the loss of signals which, in turn, may result in the inaccurate determination of position.

One such long-range radio navigation system with which this invention may be utilized is the Omega system. The operation of this system is described in report number AD–630900 by Pierce, Palmer, Watt and Woodward which is available at the Defense Documentation Center and which is entitled "Omega—a World Wide Navigational System." In addition, information concerning the Omega Navigational System is available in U.S. Naval Research Laboratory Report number 1683 by Kline, Thornhill and Williams entitled "Summary of the Flight Performance of the NRL Mark I and Mark II Omega Aircraft Receivers." Studies have shown that six to eight Omega stations should provide navigation coverage of the entire earth. These Omega stations will transmit phase-synchronized signals on a time-sharing basis and will be identified by the differences in duration of their transmissions and by the times at which they transmit. A navigation receiver will measure the phase differences of the signals of two pairs of stations, thus locating the receiver on two intersecting lines-of-position. For a given pair of stations, the phase readings will repeat at approximately eight-mile intervals along the baseline connecting the stations, and at somewhat larger intervals away from the baseline. These intervals are called lanes and are numbered, and counters on the phase indicators count the number of lanes passed through during a journey. The counters would normally be set to the lane numbers of the starting point of the trip and would thereafter indicate the numbers of the lanes in which the receiver was located. If the signals are lost for a period of time sufficient for the receiver to pass through one or more lanes, as well may be the case with modern high speed aircraft, the lane count will be in error and must be corrected from an independent fix.

Accordingly, the general purpose of this invention is to provide a radio navigation aircraft receiver which embraces all the advantages of similarly employed aircraft receivers and possesses none of the aforedescribed disadvantages. To obtain this the present invention contemplates a unique arrangement of automatic gain control (or signal level) circuits with external rate-aiding, stored wind voltage, and phase-measuring and dead-reckoning circuits whereby if sufficient signal is unavailable for the phase-measuring circuits, the automatic gain control circuits will cause the phase-measuring, rate-aiding, integrator and dead-reckoning circuits to lapse into the dead-reckoning mode of operation as opposed to the normal signal or phase tracking mode of operation. However, when there is sufficient signal available to the inputs of the phase-measuring circuits, the automatic gain control circuits will cause the phase-measuring and integrator circuits to return to the signal or phase tracking mode of operation from the dead-reckoning mode.

An object of the present invention is the provision of a radio navigation receiving system which has the advantages of both a dead-reckoning system and a system employing ground radio stations, such as the Omega navigation system.

Another object is to provide a system for interconnecting a dead-reckoning system with a hyperbolic or circular system so as to automatically and continuously yield position information based on data received from both systems.

A further object of the invention is the provision of a system for interconnecting automatic gain control and signal level circuits with phase-measuring circuits so as to automatically and continuously yield position information based on Omega station signals when sufficient signal level is available and based on data received from the dead-reckoning portions of the phase-measuring circuits when there is insufficient signal strength available from the Omega station.

Still another object is to provide a radio navigation receiving system which operates automatically during the interruption of signals to indicate the correct lane count and the corresponding position of the aircraft.

Yet another object of the present invention is the provision of new and improved radio navigation receiving equipment for use in radio position-finding systems, such as the Omega system, and including apparatus operative during the interruption in the normal operation of the system to automatically indicate the correct lane count.

Other objects and features of the invention will become apparent to those skilled in the art as the disclosure is made in the following description of the invention as illustrated in the accompanying sheet of drawing in which:

The figure shows, partly in schematic and partly in block diagram form, a preferred embodiment of the invention.

Referring now to the drawing there is shown an antenna 4 coupled to receiver 5, which may comprise an antenna coupler, R-F amplifier, two band pass filters, a three-stage low-lever limiter, mixer, and an I-F amplifier, all of which are not shown for the sake of clarity since they form no part of the instant invention. The output of receiver 5 is then coupled through line 6 to the input of phase detector 7; the output of which, in turn, is coupled through relays $R_1$, $R_2$ and $R_3$, respectively, to the inputs of three phase-measuring servos A, B and C, respectively, which are identical, so that only one, servo A, is shown in any detail. It should be understood that although three identical servos are shown in the figure more than three servos may be used depending upon the type of navigation system which is utilized, and that three servos are shown merely for the sake of clarity in describing the instant invention.

Considering now just one of the servos, i.e. phase-measuring servo A, there is shown an R-C filter 8 which is coupled to the relay $R_1$. The output of the filter 8 is then coupled to chopper 9 which is directly connected to servo amplifier 11. The output of the servo amplifier 11 drives the servo motor 12, which is provided with a rate generator 13 that is also coupled to the input of servo amplifier 11 so as to make the motor rate proportional to the error signal amplitude, i.e. the difference between the chopper output and the rate generator output. The motor 12 also drives through a gear head 14, a mechanical shaft 15, phase shifter 16 and the input shaft 17 of a clutch 18. In addition, the shaft 15 of phase shifter 16 is coupled to a digital counter 19. The operation of clutch 18 is controlled by a timer (not shown) and the shaft output 23 of the clutch 18 is coupled to a voltage-storage means, e.g., potentiometer 24, the output of which, in turn, is coupled to relay $R_1$ in such a way that when the relay is activated it closes the circuit to phase detector 7, and when the relay $R_1$ is inactivated it opens the circuit to phase detector 7 and contacts the output of the potentiometer 24.

An additional input 26 to the servo amplifier 11 is shown in the figure, and this input, which is continuously applied to the servo amplifier, is derived essentially from aircraft speed and heading by means of a simple arrangement of resolvers (not shown). The inputs to the resolvers, which form a simple computer (not shown), consist of the bearings of the three Omega stations from the aircraft, the aircraft speed and aircraft heading. The computer to be used with this receiver has manual inputs for Omega station bearings and servo inputs for speed and heading of the aircraft. The heading may come from any standard aircraft compass system (not shown) and the speed from some form of speed indicating device (not shown) such as a true air-speed computer, inertial navigator or Doppler system. In addition, each of the phase shifters 16 within each of the phase-measuring servos receives an electrical input 27 from a common frequency standard. The outputs of each of the phase shifters 16, only one of which is shown, are coupled through relays $R_4$, $R_5$ and $R_6$ to the coherent phase detector 7 so as to supply a reference phase to the detector 7. This forms a closed loop in which the phase shifter shaft angle 15 is a measure of the phase difference between the signal into the phase shifter 16 from frequency standard 27 and the Omega signal being received by antenna 4, receiver 5, and phase detector 7.

Although only one of these servos has been descrbied in detail it should be understood that each of the three servos shown in the figure are identical with one another and that the servos 28 and 29 or B and C, respectively, are identical to the servo which has been shown in detail.

The output of receiver 5 is also coupled through line 31 to amplitude detector 32. Because the phase-measuring servos operate to supply a signal phase to the phase detector 7 which is always 90° away from the Omega signal phase, the reference signal supplied to the detector 32 must be shifted by 90° by the 90° phase shifter 21 so as to put the reference signal in phase with the Omega signal. Consequently, this detector 32 has an output which is proportional to the amplitude of the signal from the receiver 5, which output is coupled to R-C filter 33. The output of the filter 33 is then connected to chopper 34, and the chopper 34 is coupled through servo amplifier 35 to motor 36. The motor 36 is provided with the rate generator 37 which is also coupled to the servo amplifier 35 to make the motor rate proportional to the error signal amplitude. The motor 36 also drives, through a gear head 38, a series of three clutches 41, 42 and 43, each of which is also controlled by a timer (not shown). Each of the clutches 41, 42 and 43, in turn, is mechanically coupled to respective potentiometers 44, 45 and 46; and one electrical side of each of the outputs of potentiometers 44, 45 and 46 is coupled through one pole of each of the double-pole single-throw relays $R_7$, $R_8$ and $R_9$, respectively, to the input of chopper 34. The other sides of the electrical outputs of each of the potentiometers 44, 45 and 46 are coupled through the other poles of relays $R_7$, $R_8$ and $R_9$ to the receiver 5. Each of the relays $R_7$, $R_8$ and $R_9$ is electrically controlled by a timer (not shown) as is each of the relays $R_4$, $R_5$ and $R_6$. The timer (not shown) is coupled to these relays in addition to being connected to the relays $R_1$, $R_2$ and $R_3$ in such a way that when all the other relays are open relays $R_1$, $R_4$ and $R_7$ are closed. In a similar manner relays $R_2$, $R_5$ and $R_8$ close and open together as do relays $R_3$, $R_6$ and $R_9$. The outputs of each of the potentiometers 44, 45 and 46 are further coupled to voltage-sensitive triggers 51, 52 and 53, respectively, which may be Schmidt triggers or the like. The triggers are coupled to relays $R_1$, $R_2$ and $R_3$ so as to prevent the closing of these relays when the voltages in potentiometers 44, 45 and 46 are below a predetermined value even though these relays are ordered to close by the timer.

Omega is a very-low-frequency (VLF), long-range, hyperbolic radio navigation system having stations which transmit signals on a time-sharing basis which can be identified by the absolute times and the durations of the transmissions. Each station transmits for an interval of approximately one second with the total sequence for eight stations being approximately ten seconds.

The conventional navigation receiver for such a system in the hyperbolic mode measures the phase differences of signals from two pairs of stations, thus locating the receiver on two intersecting lines-of-position. For a given pair of stations and a single-frequency receiver the phase readings will repeat at approximately eight-mile intervals along the baseline connecting the stations, and at somewhat larger intervals away from the baseline. The intervals are called lanes and are numbered; and counters in the phase-measuring circuits of the receiver count the number of lanes passed through during a journey. The counters are normally set to the lane numbers of the starting point of a trip and thereafter indicate the numbers of the lanes in which the receiver is located. However, if the signals are lost for a period of time sufficient for the receiver to pass through one or more lanes, the lane count will be in error and must be corrected by an independent fix. The system of this invention contains circuits for automatic and continuous dead-reckoning and are designed to prevent such lane loss in normal aircraft operation.

In the operation of the system of this invention Omega signals $T_1$, $T_2$ and $T_3$ are received by antenna 4 on a time-sharing basis. The operation of the system will be considered only with respect to the reception of an Omega signal $T_1$; however, it should be clearly understood that the system of this invention operates in a similar manner for the reception of Omega signals $T_2$ and $T_3$, and indeed may be designed to perform in systems wherein more than one frequency of Omega signals is used and in either hyperbolic or circular coordinate modes.

During the time that the Omega signal $T_1$ is being transmitted, the relays $R_1$ and $R_4$ are activated by the timer so that the servo shown in detail in the figure responds to the signal $T_1$. Similarly, each of the servos 28 and 29, respectively, responds to Omega signals $T_2$ and $T_3$. During the period of time when the relays $R_1$ and $R_4$ are activated by the timer (not shown), if there is an error signal from the phase detector 7, the chopper 9 will convert this error signal to one which will drive the servo motor 12. Because the motor is provided with rate generator 13, which is coupled to the servo amplifier 11, the motor rate is proportional to the error signal amplitude from phase detector 7. The motor 12 also drives, through gear head 14, phase shifter 16 and the input shaft 17 of clutch 18. During the time the relays $R_1$ and $R_4$ are closed, the output of phase shifter 16 supplies the reference phase to the phase detector 7 which is coupled to the input of servo amplifier 11. This forms a closed loop in which the angle of the phase shifter shaft 15 is a measure of the phase difference between the wave into the phase shifter 16, which is supplied by frequency standard 27, and the Omega signal $T_1$ being received. The phase shifter, in turn, is coupled to digital counter 19 which indicates the lane count as the aircraft travels from one lane to another. In addition, while the relays $R_1$ and $R_4$ are closed, the clutch 18, which is also controlled by the timer (not shown), is operated so that any motion of the phase shifter shaft 15 is coupled through the potentiometer 24.

When the relays $R_1$ and $R_4$ are not energized by the timer (not shown), neither is clutch 18, and the electrical output of the potentiometer 24 is connected by the inactivated relay $R_1$ to the input of chopper 9 in order to drive the servo mechanism from the potentiometer outputs.

When a steady-state condition is reached and the aircraft speed and course have been constant for a short time, the phase-measuring servo output will stabilize with the potentiometer 24 supplying just enough voltage to enable the servo to match the phase change rate of the Omega signal $T_1$ minus the external rate input during periods of time when the signal $T_1$ is not being adequately received due to noise, or when $T_1$ is not being transmitted, e.g., while $T_2$ and $T_3$ are being transmitted. In so doing the voltage of the potentiometer 24 compensates for any difference between the rate inputs 26 and the actual motion of the aircraft, as manifested by the phase changes of the Omega signals received, which is principally the difference between air speed and ground speed. This can ideally be assumed to be a voltage proportional to the existing wind velocity. It can be seen that the phase-measuring circuits constitute essentially a dead-reckoning system which is only periodically updated by the Omega signal $T_1$ during the transmission time of that signal and when relays $R_1$ and $R_4$ are closed. During periods when signal $T_1$ is not being transmitted the relay $R_1$ is disconnected from the output of phase-measuring detector 7, and instead, is connected to the output of potentiometer 24. In this manner the phase-measuring circuits dead-reckon using the external rate input 26 and the integrated correction voltage which is stored in the potentiometer 24 in the output of the servo. If the heading or speed of the aircraft changes during the period of dead-reckoning, the external rate input 26 will adjust the rate inputs accordingly. In this manner the aircraft will continue to dead-reckon until the Omega signal $T_1$ returns, at which time the voltage of the potentiometer 24 is altered to correct any accumulated error and to correspond to the new conditions of aircraft heading and speed.

In addition to the requirement that the phase-measuring circuits dead-reckon during periods of time in which the Omega signal $T_1$ is not being transmitted, it may be necessary for the phase-measuring circuits to dead-reckon even during the normal transmission times for the Omega signal $T_1$ when this signal is lost due to external atmospheric conditions, or other reasons. In accordance with this invention, therefore, when the signal $T_1$ is lost or the signal-to-noise ratio becomes very small, signal level sensing or automatic gain control circuits will disconnect the output of the phase detector 7 from the phase-measuring servo system, and the phase-measuring servos will dead-reckon using the rate inputs 26 and the correction or wind voltages which are stored on the potentiometers in the outputs of the servos. The greatest error during the dead-reckoning periods will be caused by changing wind conditions since accurate dead-reckoning is predicated on the wind direction and magnitude remaining at the values existing at the time of the Omega signal loss, which values are effectively stored in the potentiometer 24. However, based on statistics of average known wind conditions at various altitudes and on the true air speed of the aircraft, calculations and tests have shown that changing wind conditions are not a significant limitation upon the successful operation of this invention.

The operation of the early stages of the automatic gain control (AGC) circuits of this invention is very similar to that of each of the phase-measuring servos. Because the phase-measuring servos operate to supply a signal phase to the phase detector 7 which is always 90° away from the Omega signal phase, the reference phase from the phase-measuring servos which is supplied to AGC detector 32 is first passed through a 90° phase shifter 21 in order to put it in phase with the Omega signal. As a result, the AGC detector 32 has an output proportional to the amplitude of the signal from the receiver 5. The AGC servo mechanism, in turn, is coupled to potentiometer 44 during the time that the Omega signal $T_1$ is being transmitted because the clutch 41 is engaged during that time period by means of the timer (not shown). The potentiometer 44 is driven until the output voltage of the potentiometer equals the output voltage of the detector 32. This is accomplished by means of chopper 34 which comprises a vibrating reed (not shown) which alternates so that the input of the chopper is first connected to the output of the detector 32 and then to the ouptut of potentiometer 44 so that any difference in the voltage outputs of detector 32 and potentiometer 44 results in an alternating current output for chopper 34 which, in turn, will drive servo motor 36. In this way servo motor 36 is driven until the potentiometer output voltage equals the detector output voltage thus resulting in a DC output from chopper 34 which will prevent the servo motor 36 from being energized.

It can be seen that as the grounded slider (not shown) of potentiometer 44 is moved from one end of the resistance element (not shown) to the other the voltage at one end increases as the voltage at the other end decreases. The voltage from one end 22 of the potentiometer 44 is used to control the servo as described above. The voltage from the other end 58 is used to control the gain of receiver 5. As can be seen from the figure, there are three potentiometers 44, 45 and 46, one for each AGC receiver channel, which are connected sequentially to the servo motor 36 by means of magnetic clutches 41, 42 and 43, respectively, which are controlled by the timer (not shown). In addition, it may be noted that while the clutches are not engaged it is possible to set the potentiometers 44–46 by hand so that manual gain control is available when desired simply by switching off any or all of the clutches 41–43.

The voltage from the end 22 of potentiometer 44 which is used to control the servo as hereinbefore described is also used in conjunction with a voltage-sensitive trigger 51, which is coupled directly to relay R₁. In the event that the intensity of the Omega signal $T_1$ becomes too weak and the output from AGC detector 32 is correspondingly insufficient the voltage from the end 22 of potentiometer 44 which is used to control the servo will also decrease accordingly. When this occurs, the voltage-sensitive trigger 51 will act so as to hold open relay $R_1$, for example, by means of opening still another relay (not shown) within the circuit of $R_1$ itself. In this manner when the Omega signal $T_1$ is lost or the signal-to-noise ratio becomes too small the phase-measuring detector 7 will be disconnected from the phase-measuring circuits and the phase-measuring servos will dead-reckon using the external rate inputs 26 and the correction voltage which is stored on the potentiometer 24. In this manner the aircraft will continue to dead-reckon until the Omega signal $T_1$ returns or the noise decreases, thus preventing the noise accompanying a weak or absent Omega signal $T_1$ from driving the phase-measuring servos off of the correct lane count.

It should be clearly understood from the figure that each of the potentiometers 45 and 46 operates in an identical manner as compared with potentiometer 44 when Omega signals $T_2$ and $T_3$ are being transmitted, respectively. It should also be clear that voltage-sensitive triggers 52 and 53 operate in a manner similar to voltage-sensitive trigger 51 but with respect to relays $R_2$ and $R_3$, respectively.

It can be seen that the present radio navigation receiving system has widespread use particularly for high speed aircraft. This system is a "non-transmitting" dead-reckoning system rather that an active system such as Doppler radar and has the advantage of relative low cost and security. In addition, the use of this system is independent of the distance traveled, since it has the ability of self-correction after a reasonably short period of signal loss where relatively continuous reception of signals is available. By using this system modern high speed aircraft can obtain consistent, continuous and accurate navigation all over the world even through periods of high noise and lost signals.

What is claimed and desired to be secured by Letters Patent of the United States is:

1. A radio navigation receiving system adapted for use in high speed vehicles comprising:
   antenna means to receive predetermined signals;
   receiver means operatively associated with said antenna means to process said signals;
   phase-measuring and dead-reckoning means operative to measure the phases of said signals so as to indicate the position of said vehicle and to continuously dead-reckon the position of said vehicle during periods when said signals are not distinguishable by said receiver means; and
   automatic gain control means responsive to the amplitude of said predetermined signals to adjust the gain of said receiver means and operative to enable said phase-measuring and dead-reckoning means to switch to a dead-reckoning mode of operation when the amplitudes of said signals are below a predetermined value or when the signal-to-noise ratios of said signals are below a predetermined value.

2. The receiving system of claim 1 wherein said phase-measuring and dead-reckoning means includes;
   a plurality of phase-measuring servos; and
   a phase detector coupled between said phase-measuring servos and said receiver means.

3. The system of claim 2 wherein the output of said phase detector is detachably coupled to the inputs of each of said phase-measuring servos and wherein the outputs of said phase-measuring servos are detachably coupled to one of the inputs of said phase detector.

4. The system of claim 3 wherein relays are operatively associated between said phase detector and said phase-measuring servos to be activated at predetermined time intervals when the amplitudes of said received signals are above a predetermined value or when the signal-to-noise ratios of said signals are above a predetermined value.

5. The system of claim 4 wherein each of said phase-measuring servos includes voltage storage means operative to store a voltage representative of wind velocity.

6. A system of claim 5 wherein the output of each of said voltage storage means is detachably coupled to the input of its respective phase-measuring servo to enable the stored voltage of said voltage storage means to act as an input to its respective phase-measuring servo when the amplitudes of said received signals are below a predetermined value or when the signal-to-noise ratios of said signals are below a predetermined value.

7. The system of claim 6 including a respective external rate input coupled to each of said phase-measuring servos.

8. The system of claim 7 wherein said external rate inputs are operatively coupled to said phase-measuring servos to provide continuous information of the speed and heading of said high speed vehicle.

9. The system of claim 6 wherein each of said phase-measuring servos includes a clutch and a respective voltage storage means operatively associated to enable said clutch to engage said voltage storage means at predetermined time intervals.

10. The system of claim 3 wherein each of said phase-measuring servos includes a phase shifter and a frequency standard of a predetermined frequency coupled together.

11. The system of claim 1 wherein said automatic gain control means includes:
    an amplitude detector; and
    a plurality of voltage storage means operatively associated therewith to store voltages proportional to the amplitudes of said predetermined signals.

12. The system of claim 11 including phase shift means coupling an input of said amplitude detector to the outputs of said phase-measuring servos.

13. The system of claim 11 wherein an output of each of said voltage storage means is detachably coupled to said receiver means.

14. The system of claim 12 wherein relays to be activated at predetermined time intervals are operatively associated between said voltage storage means and said receiver means.

15. The system of claim 12 including a respective voltage sensitive trigger operatively associated with each of said voltage storage means and a respective one of said phase-measuring servos to enable said phase-measuring servos to operate in a dead-reckoning mode when the voltages of said voltage storage means are below a predetermined value.

References Cited

UNITED STATES PATENTS

| | | | |
|---|---|---|---|
| 2,715,995 | 8/1955 | Wirkler | 343—112 |
| 3,070,796 | 12/1962 | Gray | 343—105 |
| 3,204,241 | 8/1965 | Björkman | 343—105 X |
| 2,768,374 | 10/1956 | Rust | 343—105 |

RODNEY D. BENNETT, *Primary Examiner.*

H. C. WAMSLEY, *Assistant Examiner.*